United States Patent
Kim et al.

(10) Patent No.: US 7,733,823 B2
(45) Date of Patent: Jun. 8, 2010

(54) METHOD OF SCHEDULING FOR ENHANCED DEDICATED CHANNEL (E-DCH)

(75) Inventors: Bong Hoe Kim, Gyeonggi-Do (KR); Joon Kui Ahn, Seoul (KR); Hak Seong Kim, Seoul (KR); Dong Wook Roh, Seoul (KR); Dong Youn Seo, Seoul (KR); Seung Hwan Won, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 655 days.

(21) Appl. No.: 11/121,891

(22) Filed: May 4, 2005

(65) Prior Publication Data

US 2005/0249154 A1 Nov. 10, 2005

(30) Foreign Application Priority Data

May 4, 2004 (KR) .................. 10-2004-0031456

(51) Int. Cl.
*H04W 4/00* (2009.01)
*H04J 3/24* (2006.01)
*H04B 7/00* (2006.01)

(52) U.S. Cl. .................. 370/328; 370/474; 455/522

(58) Field of Classification Search .......... 370/332, 370/335, 474, 229, 342, 252, 328; 455/422, 455/442, 522; 375/260
See application file for complete search history.

(56) References Cited

U.S. PATENT DOCUMENTS

| | | | |
|---|---|---|---|
| 7,339,998 B2 * | 3/2008 | Murata et al. | 375/260 |
| 7,428,424 B2 * | 9/2008 | Hwang et al. | 455/522 |
| 2002/0164980 A1 * | 11/2002 | Eriksson et al. | 455/422 |
| 2003/0133429 A1 | 7/2003 | Choi et al. | |
| 2003/0193913 A1 * | 10/2003 | Murata et al. | 370/332 |
| 2004/0174850 A1 * | 9/2004 | Vimpari et al. | 370/335 |

(Continued)

FOREIGN PATENT DOCUMENTS

EP 0977393 2/2000

(Continued)

OTHER PUBLICATIONS

Panasonic: "Alternative signaling method to control Node B controlled TFC," 3GPP TSG-RAN Working Group 1 Meeting #35, R1-031333, [online], Oct. 6, 2003 [retrieved on Sep. 8, 2006]. Retrieved from the Internet: ,URL: http://www.3gpp.org/ftp/tsg_ran/wG1_RL1/TSGR1_35/Docs/Zips?R1-031333.zip>. Especially figure 3.

(Continued)

*Primary Examiner*—Charles N Appiah
*Assistant Examiner*—Kiet Doan
(74) *Attorney, Agent, or Firm*—McKenna Long & Aldridge LLP

(57) ABSTRACT

A method of scheduling for an Enhanced Dedicated Channel (E-DCH) in a user equipment (UE) is disclosed. More specifically, a method of receiving an information indicating an allowable transmit power range from a base station and updating a group of Transport Format Combinations (TFCs) allowed by the base station by selecting the TFCs that can be used within the allowable transmit power range. Furthermore, the method comprises transmitting the E-DCH by at least one TFC selected from the group of TFCs.

5 Claims, 3 Drawing Sheets

U.S. PATENT DOCUMENTS

| | | |
|---|---|---|
| 2004/0219919 A1* | 11/2004 | Whinnett et al. ............ 455/442 |
| 2005/0068921 A1 | 3/2005 | Liu |
| 2005/0141560 A1* | 6/2005 | Muthiah ..................... 370/474 |
| 2006/0234741 A1* | 10/2006 | Provvedi ................... 455/513 |
| 2007/0127369 A1* | 6/2007 | Sebire ........................ 370/229 |

FOREIGN PATENT DOCUMENTS

| | | |
|---|---|---|
| EP | 1 248 485 | 10/2002 |
| JP | 2003-304195 | 10/2003 |
| KR | 10-2003-0096406 | 12/2003 |
| KR | 10-2005-0073497 | 7/2005 |
| RU | 2173504 | 6/2000 |
| RU | 2197786 | 1/2003 |
| WO | WO 99/00911 | 1/1999 |
| WO | WO 99/63692 | 12/1999 |
| WO | WO 00/48328 | 8/2000 |
| WO | WO 01/45299 | 6/2001 |
| WO | WO 01/45299 A1 | 6/2001 |
| WO | WO 03/041317 | 5/2003 |
| WO | WO 03/041317 A1 | 5/2003 |
| WO | WO 03/107694 | 12/2003 |
| WO | WO 03/107694 A1 | 12/2003 |

OTHER PUBLICATIONS

Siemens: "Node B controlled rate scheduling by fast UE transmission power limitation", 3GPP TSG-RAN Working Group 1 Meeting #33, R1-030791, [online], Aug. 25, 2003 [retrieved on Sep. 7, 2006]. Retrieved from the Internet: <URL:http://www.3gpp.org/ftp/tsg_ran/WG1_RL1/TSGR1_33/Docs/Zips/R1-030791.zip. the whole document.

Panasonic; "Alternative Signalling Method to Control Node B Controlled TFC;" 3GPP TSG-RAN WG1 Meeting #35, Seoul, Korea, Oct. 6-10, 2003.

Siemens: "Node B Controlled Rate Scheduling by Fast UE Transmission Power Limitation" TSG-RAN Working Group 1 (Radio) Meeting #33, New York, USA, Aug. 25-29, 2003.

Springer, A, et al. "Impact of nonlinear amplifiers on the UMTS system." IEEE Sixth International Symposium on Spread Spectrum Techniques and Applications. 2000.

ETSI TS 125 213 V6.0.0 (Dec. 2003).

ETSI TS 125 211 V6.0.0 (Dec. 2003).

ETSI, TS 125.213, V4.4.0, Dec. 2003.

Samsung Electronics: "Uplink Channel Structure for HSDPA", TSG-RAN WG1/WG2 Joint Meeting HSDPA, Apr. 2001, pp. 1-2, XP002206397.

* cited by examiner

METHOD OF SCHEDULING FOR ENHANCED DEDICATED CHANNEL (E-DCH)

This application claims the benefit of Korean Application No. P2004-31456, filed on May 4, 2004, which is hereby incorporated by reference.

BACKGROUND OF THE INVENTION

1. Field of the Invention

The present invention relates to a method of scheduling, and more particularly, to a method of scheduling for Enhanced Dedicated Channel (E-DCH). Although the present invention is suitable for a wide scope of applications, it is particularly suitable for efficiently performing uplink scheduling and rate controlling functions.

2. Discussion of the Related Art

In the Rel-99/Rel-4/Rel-5 systems, the Radio Network Control (RNC) performs uplink scheduling and rate controlling functions. More specifically, the RNC assigns transport format combinations (TFCs) subsets to Node B from the TFC subsets configured by the RNC. Thereafter, a base station (Node B) assigns the TFC subsets for a user equipment (UE). The relationships of the RNC configured TFC subsets with respect to Node B controlled TFC subsets and UE controlled TFC subsets are illustrated in FIG. 1.

The problem of such TFC subset restriction imposed on Node B is that it is inefficient in performing uplink scheduling and rate controlling functions since Node B has to go through RNC. In addition, because the RNC has control of TFC subset restriction, response time to changes in transmission is slow.

SUMMARY OF THE INVENTION

Accordingly, the present invention is directed to a method of scheduling for E-DCH that substantially obviates one or more problems due to limitations and disadvantages of the related art.

Another object of the present invention is to provide a method for scheduling for E-DCH.

An object of the present invention is to provide a method for scheduling by transmit power restriction.

Further object of the present invention is to provide a method of signaling of a transmit power restriction for E-DCH.

Another object is to provide a communication system for scheduling by transmit power restriction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of scheduling for E-DCH in a user equipment includes receiving an information indicating an allowable transmit power range from a base station, updating a group of TFCs allowed by the base station by selecting the TFCs that can be used within the allowable transmit power range, and transmitting the E-DCH by at least one TFC selected from the group of TFCs.

In another aspect of the present invention, a method includes receiving information on a total range of UE transmit power, setting a reference transmit power value for each UE, and signaling a transmit power offset, wherein the transmit power offset is a difference value between the reference transmit power value and a scheduled power value.

In another aspect of the present invention, a system includes a user equipment (UE) for receiving an information indicating an allowable transmit power range from a base station, updating a group of Transport Format Combinations (TFCs) allowed by the base station by selecting the TFCs that can be used within the allowable transmit power range, and transmitting the E-DCH by at least one TFC selected from the group of TFCs.

In another aspect of the present invention, a method includes receiving an information indicating an allowable transmit power range from a base station, selecting at least one Transport Format Combinations (TFCs) that can be used within the allowable transmit power range, and transmitting the E-DCH by at least one TFC selected from the at least one selected TFCs. In the method, selecting the TFCs that can be transmitted within the allowable transmit power range comprises setting a reference transmit power value for the each UE and signaling a transmit power offset, which is a difference value between the reference transmit power value and a scheduled power value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In order to promote efficiency and fast response to changes in transmission, the functions traditionally performed by the RNC are given to Node B. In other words, Node B is given capability to perform functions similar to those of the RNC in the Rel-99/Rel-4/Rel-5 systems. In addition, Node B can respond more quickly with respect to uplink load function compared to the RNC controlled uplink scheduling and rate controlling functions. It is also possible for Node B performing uplink scheduling and rate controlling functions to more accurately control uplink interference and consequently, increase storage and service coverage area. Furthermore, Node B has faster response time than the RNC which allows for more efficient uplink transmission power control and higher transmission rate.

There are two kinds of methods of Node B controlled uplink scheduling with respect to E-DCH. As mentioned above, the term base station can also be used to describe Node B. A first method associated with TFC subset restriction which includes rate scheduling with fast TFC subset restriction and time and rate scheduling with TFC subset restriction. The second method relates to Node B controlled scheduling by transmit power restriction.

The method of the Node B controlled rate scheduling by fast TFC subset restriction controls the TFC selection algorithm of a UE through imposition of a new restriction and allows TFC subset in Node B. From the UE point of view, this rate scheduling method is similar to the methods presented in Rel-99/Rel-4/Rel-5 systems with an exception of using a control signal in the physical layer for the TFC selection algorithm. Moreover, from the viewpoint of UMTS Terrestrial Radio Access Network (UTRAN), this rate scheduling function is an added function to Node B. The function described with respect added functions to Node B can be applied to Node B via Radio Resource Control (RRC) procedure and TFC control. Because Node B has control of TFC subset restriction, Node B can respond quickly to changes in uplink transmission load.

Figure 1:
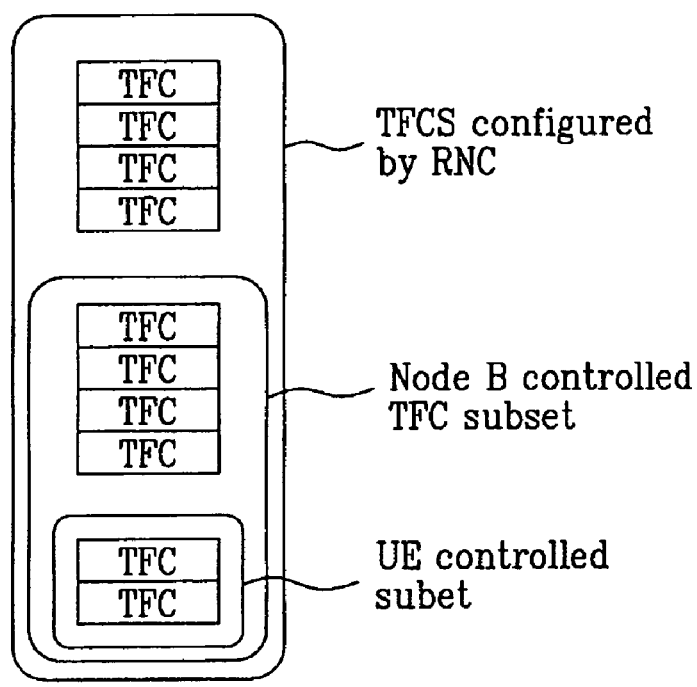
FIG. 1 illustrates a relationship of the Radio Network Control (RNC) configured transport formation combination (TFC) subsets with respect to a base station (Node B) controlled TFC subsets and a user equipment (UE) controlled TFC subsets.

There are two subset categories which apply to the TFC selection algorithm—"Node B allowed TFC subset" and "UE allowed TFC subset." The relationship of Node B allowed TFC subset and UE allowed TFC subset with respect to the TFC subset allocated by the RNC is illustrated in FIG. 1. The operation of the TFC subsets of FIG. I is as follows. Node B determines the TFC subsets for a UE and is labeled "UE allowed TFC subset." In addition, the RNC determines the TFC subsets allocated to Node B and is labeled "Node B allowed TFC subset." These set of TFC subsets are determined for each UE.

Figure 2:
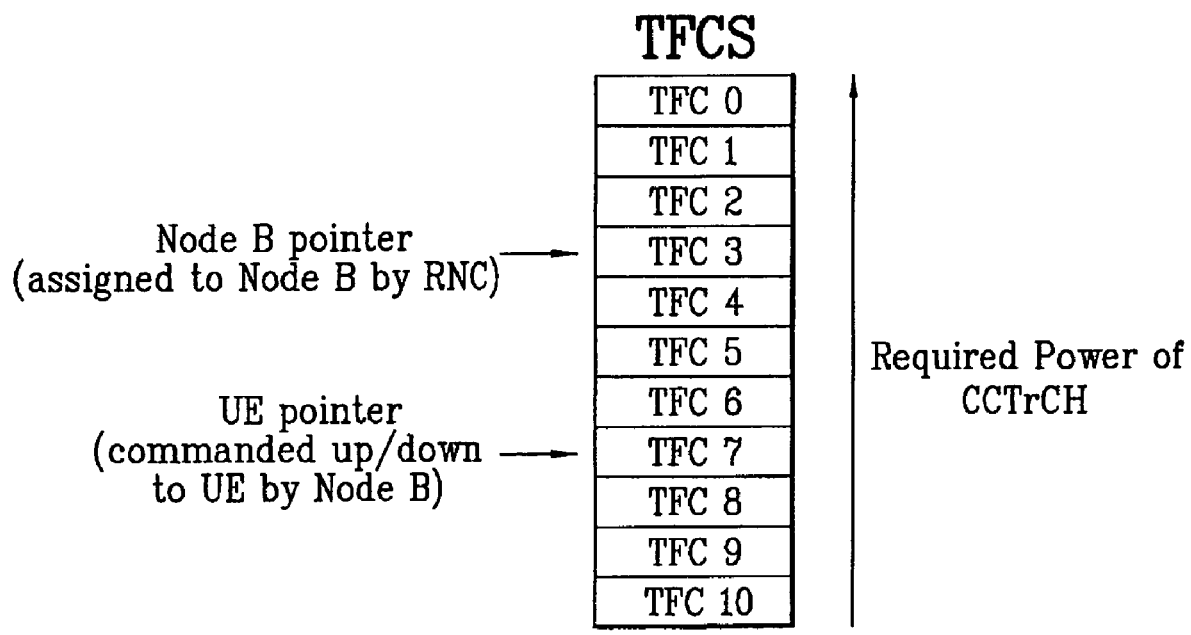
FIG. 2 illustrates Node B pointer and UE pointer.

Along with these two subsets, there are two TFC pointers which apply to these two subsets as illustrated in FIG. 2. Here, one of the TFC pointers is a Node B pointer which is assigned to Node B by the RNC. The Node B pointer designates a TFC subset having maximum power level that can be used by Node B. The other TFC pointer is a UE pointer which is commanded up/down to UE by Node B. The UE pointer goes through different TFC subsets until it reaches a designated TFC subset. One point to note is that the UE pointer cannot exceed the TFC subset designated by Node B pointer.

The method for Node B controlled time and rate scheduling with TFC subset restriction relates to allowance of Node B control of TFC subset in a UE and allowance of transmission time based on physical layer signaling. The difference of this method to the rate scheduling with fast TFC subset restriction is that the UE has to receive assignment regarding additional control information of TFC selection in the physical layer and control information of transmission time in the physical layer from Node B. From the UTRAN point of view, Node B has been given the functions associated with the TFC subset pointer and transmission time control. Furthermore, through controlling the TFC subset of the UE and the transmission time by the RNC and Node B, the UTRAN controls the changes in the uplink transmission load. More specifically, unlike controlling the TFC subset of the UE through controlling continuous up/down control with the pointer, the UE sends the TFC subset pointer to provide Node B with information on how much data can be transmitted at a specified time.

In the methods of TFC subset restriction, Node B directly signals the index of TFC of maximum transmit power within allowed TFC subset or signals up/down command for the index to inform a user equipment (UE) of the allowed TFC subset. In both cases, the UE orders all the possible TFCs in the transmit power domain and this is allowed to transmit E-DCH data with TFC whose transmit power does not exceed the transmit power of the TFC controlled by Node B.

With respect to scheduling of multiple transport channels for E-DCH, there may be various transport format combinations (TFCs) of the transport channels so the number of possible TFCs can be large if multiple transport channels are allocated to E-DCH. Although, required transmit power levels of some TFCs may not be so different, all the TFCs should be indexed separately. Moreover Node B should be able to signal the index for TFC restriction in case of time and rate scheduling by TFC restriction.

Furthermore, in connection with scheduling of Hybrid Automatic Repeat Request (HARQ) retransmission, the required transmit power for a retransmission of E-DCH packet may be different from that for the initial transmission even when the TFCs of initial transmission and retransmission are same. Especially, a transmit power smaller than that for the initial transmission may be sufficient for a retransmission. To support different transmit power between initial transmission and retransmission, the UE should apply different rules in mapping of TFC to the required transmit power between initial transmission and retransmission. For this purpose, TFC subset restriction assigned by Node B can be re-interpreted as transmission power restriction rather than direct restriction to the TFC at the UE side. However, if Node B makes restriction on the transmit power directly, the UE can use a common rule in interpreting the Node B scheduling command for both the initial transmission and retransmission.

In view of the disadvantages of TFC subset restrictions, a direct scheduling by transmit power method can be used for more efficient and simpler scheduling. As mentioned above with respect to Node B controlled uplink scheduling methods, there is also a method of Node B controlled scheduling by transmit power restriction. The main purpose of Node B controlled scheduling by transmit power restriction is to schedule the uplink transmission power in real time so as to control the uplink interference more efficiently. Therefore, direct scheduling of uplink transmission power of each UE can be a straightforward way of controlling Node B scheduling, and at the same time, simplifying many signaling issues.

Figure 3:
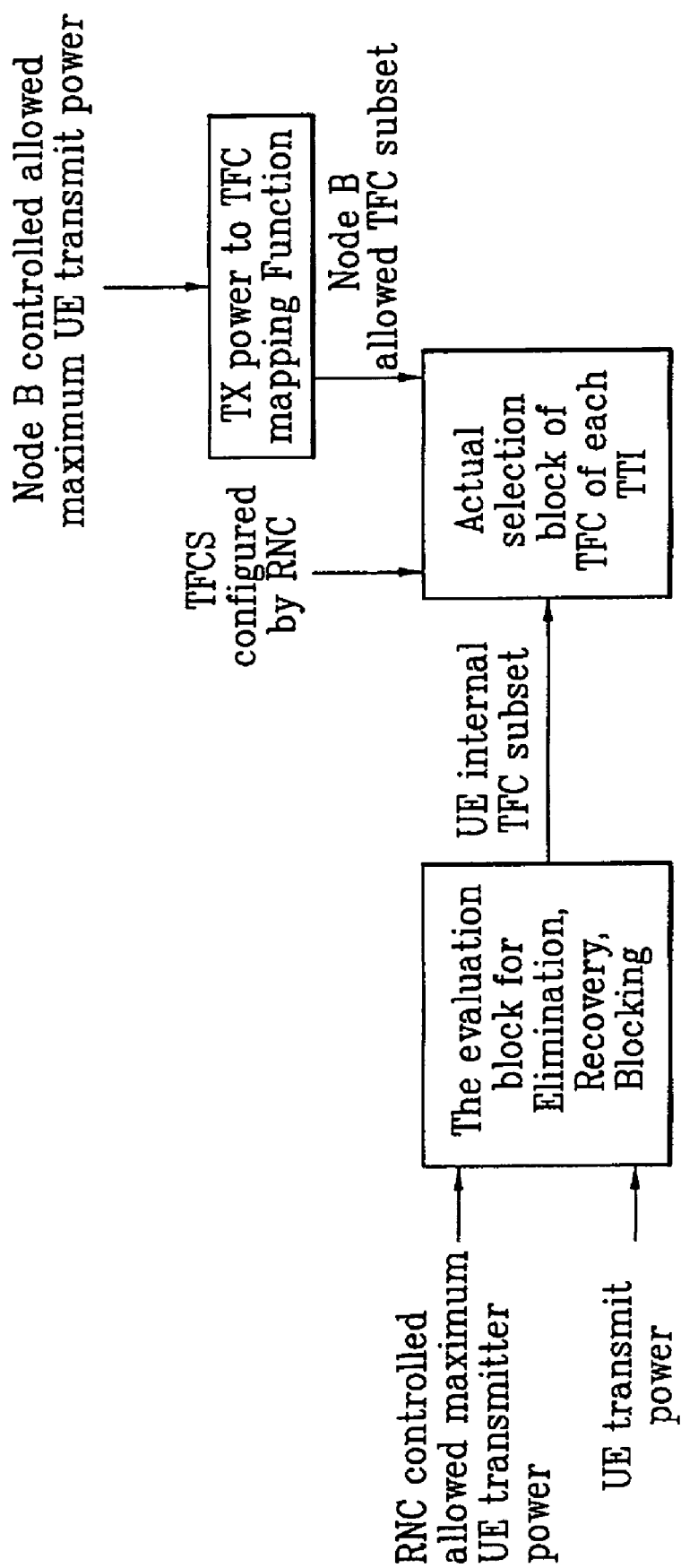
FIG. 3 shows an implementation of Node B controlled transmit power restriction at UE.

In Node B controlled scheduling by transmit power restriction, Node B signals the allowed maximum transmit power to each UE directly or by signaling up/down command. FIG. 3 shows an implementation of Node B controlled transmit power restriction. Here, UE updates Node B allowed TFC subset every scheduling command by selecting TFCs that can be transmitted within the Node B allowed transmit power, and then, the UE transmits by only the TFCs included in that Node B allowed subset. The UE may use some ordering and mapping function of TFCs with regard to the transmit power.

In general, the transmit power restriction can achieve the same goal with TFC subset restriction since the basic algorithms of two methods are same and difference is the way of signaling and interpretation of the scheduling commands. However, the method of transmit power restriction can make the downlink scheduling command simpler since it does not depend on the TFC configuration but only depends on the transmit power.

As in TFC subset restriction, two signaling methods of scheduling command can be considered for signaling of the transmit power restriction. First is direct signaling of allowed transmit power level, and the second is signaling of differential value or offset value from the previous assignment. The pros and cons of the two methods are same with those in Node B scheduling by TFC subset restriction. However, in case of direct signaling of allowed transmit power, the number of possible transmit power levels may be too large if a whole range of possible UE transmit power is considered, which can require quite a large number of signaling bits for the Node B scheduling. In reality, actual variation of required transmit power of a given UE can be much smaller and the operating point in transmit power of each UE can be different depending on the geometrical position or long-term link gain of the UE.

Figure 4:
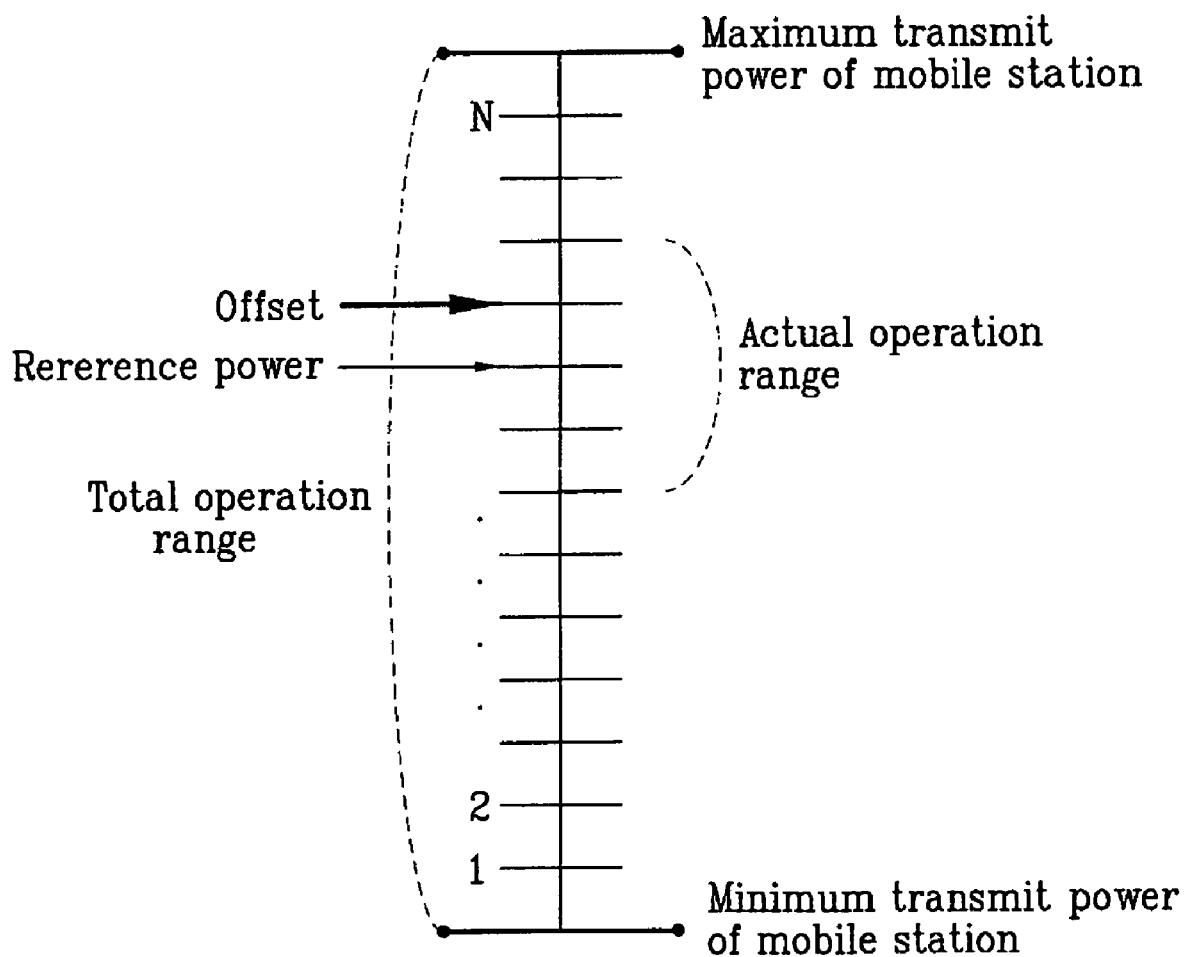
FIG. 4 illustrates signaling of power offset based on reference transmit power.

The actual range of UE transmit power will likely be much smaller than the whole possible range of transmit power supported by a UE. Therefore, a simple way of reducing the required signaling bandwidth is to set a common reference power between Node B and each UE in advance, and then to signal the difference value between the reference power and scheduled power. The reference power value should be set differently for each UE for the efficient signaling of power restriction commands. The RNC may set those values appropriately considering the actual transmit power range of each UE, or else, uplink Dedicated Physical Control Channel (DPCCH) transmit power of each UE may be used as the reference power. FIG. 4 depicts this concept.

Lastly, the scheduling by transmit power restriction rather than TFC subset restriction can simplify the scheduling command as well as the HARQ procedure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting an Enhanced Dedicated channel (E-DCH) by user equipment (UE), the method comprising:

received, at the UE, scheduling information from a base station, scheduling information including an offset value that represents a relative difference between a presently assigned maximum transmit power level and a current maximum transmit power level;

update, at the UE, a value that represents assigned maximum transmit power level base on the offset value received from the base station;

selecting, at the UE, a transport Format Combination (TFC) base on the update value that represents assigned maximum transmit power level; and transmitting the E-DCH in according with the selected TFC, wherein the presently assigned maximum transmit power level is determined at the base station at least based on actual transmit power range associated with the UE or the location of the UE relative to the base station.

2. The method of claim 1, wherein updated value is the maximum transmit power associated with the E-DCH.

3. A method of controlling transmit power for an Enhanced Dedicated channel (E-DCH) by a base station, the method comprising:

transmitting scheduling information from the base station to user equipment (UE), the scheduling information including an offset value that represents a relative difference between a presently assigned maximum transmit power level associated with the UE and a current maximum transmit power level associated with the UE, and receiving, at the base station an E-DCH which was transmitted by the UE in accordance with a Transport Format Combination (TFC), wherein the TFC is based on an updated, current maximum transmit power level, wherein the updated, current maximum transmit power level was updated based on the offset value, and wherein the presently assigned maximum transmit power level associated with the UE is at least based on actual transmit power range associated with the UE or the location of the UE relative to the base station.

4. The method of claim 3, wherein transmitting scheduling information comprises:

transmitting a plurality of offset values, wherein each offset value corresponds with a corresponding one of a plurality of UE.

5. The method of claim 4, wherein the plurality of offset values are determined at the base station based on actual transmit power ranges associated with the plurality of UE.

* * * * *